US009627866B2

(12) United States Patent
Pawar et al.

(10) Patent No.: US 9,627,866 B2
(45) Date of Patent: Apr. 18, 2017

(54) DOOR MOUNTED VENT FLAP STRUCTURE FOR ARC-RESISTANT COMPARTMENT

(71) Applicant: ABB TECHNOLOGY AG, Zurich (CH)

(72) Inventors: Rahul Pawar, Lake Mary, FL (US); Alessandro Bonfanti, Lake Mary, FL (US); Jerry Earl, Apopka, FL (US)

(73) Assignee: ABB SCHWEIZ AG, Baden (CH)

( * ) Notice: Subject to any disclaimer, the term of this patent is extended or adjusted under 35 U.S.C. 154(b) by 196 days.

(21) Appl. No.: 14/447,943

(22) Filed: Jul. 31, 2014

(65) Prior Publication Data
US 2016/0035518 A1  Feb. 4, 2016

(51) Int. Cl.
H02B 13/025 (2006.01)
H02B 1/56 (2006.01)
H01H 9/34 (2006.01)
H02B 1/38 (2006.01)

(52) U.S. Cl.
CPC ............ *H02B 13/025* (2013.01); *H02B 1/56* (2013.01); *H02B 1/565* (2013.01); *H01H 9/342* (2013.01); *H02B 1/38* (2013.01)

(58) Field of Classification Search
CPC .................................................. H02B 13/025
USPC ........................... 49/168, 169, 171, 356, 359
See application file for complete search history.

(56) References Cited

U.S. PATENT DOCUMENTS

| 1,148,877 | A | * | 8/1915 | Walter | E05C 17/166 |
| | | | | | 292/277 |
| 2,379,528 | A | * | 7/1945 | Kelliher | E06B 3/50 |
| | | | | | 16/229 |
| 2,869,952 | A | * | 1/1959 | Saunders | E05C 19/02 |
| | | | | | 109/63.5 |
| 3,045,663 | A | * | 7/1962 | McDonnold | F24C 15/023 |
| | | | | | 126/190 |
| 3,129,024 | A | * | 4/1964 | Schuessler | E05C 17/52 |
| | | | | | 292/15 |
| 3,525,296 | A | * | 8/1970 | Haapanen | B60H 1/248 |
| | | | | | 454/340 |
| 4,516,813 | A | * | 5/1985 | Sekerich | E05D 15/582 |
| | | | | | 16/288 |
| 4,770,087 | A | * | 9/1988 | Danley | E06B 7/082 |
| | | | | | 160/92 |

(Continued)

Primary Examiner — Katherine Mitchell
Assistant Examiner — Marcus Menezes
(74) Attorney, Agent, or Firm — Manelli Selter PLLC; Edward J. Stemberger

(57) ABSTRACT

A door for an arc-resistant compartment includes an opening there-through. Flap structure includes a flap member coupled to the door and movable between an opened position permitting air to pass through the opening, and a closed position covering the opening. Spring structure is engaged with the flap member to bias the flap member to the closed position. Handle structure is coupled to the flap member and extends through the door for moving the flap member to the opened position against the bias of the spring structure. Retaining structure provides a retaining force on the flap member to retain the flap member in the open position, against the bias of the spring structure. During an arcing event in the compartment, pressure within the compartment together with the bias of the spring structure overcomes the retaining force to automatically move the flap member to the closed position.

10 Claims, 4 Drawing Sheets

(56) References Cited

U.S. PATENT DOCUMENTS

| | | | |
|---|---|---|---|
| 7,974,078 B2* | 7/2011 | Coomer | H02B 13/025 |
| | | | 312/236 |
| 8,842,421 B2* | 9/2014 | Gingrich | H01H 33/53 |
| | | | 174/17 VA |
| 9,318,883 B2* | 4/2016 | Schmidt | H02B 13/025 |
| 2013/0019464 A1* | 1/2013 | Ballard | H01F 27/02 |
| | | | 29/602.1 |
| 2013/0320831 A1* | 12/2013 | Schmidt | H02B 13/025 |
| | | | 312/296 |
| 2015/0133042 A1* | 5/2015 | Pearce | F24F 13/08 |
| | | | 454/184 |

* cited by examiner

DOOR MOUNTED VENT FLAP STRUCTURE FOR ARC-RESISTANT COMPARTMENT

FIELD

The invention relates to arc-resistant compartments for use in the power generation/distribution industry such as a circuit breaker or a current limiter compartment and, more particularly, to a door of the compartment having vent flap structure for venting the compartment and sealing the compartment during an arcing event.

BACKGROUND

Compartments for use in the power generation/distribution industry such as a circuit breaker or current limiter compartment typically must be arc-resistant. Venting of these compartments is important to minimize the temperature rise inside the compartment. Conventionally, an opening is provided in a non-door portion of the compartment to permit air flow into the compartment. However, these openings are limited due to the configuration of the compartment and thus may not introduce adequate air flow into the compartment.

Thus, there is a need to provide a door for an arc-resistant compartment that includes vent flap structure over an opening in the door. The vent flap structure is normally opened to permit air flow into the compartment and, in the event of an arcing event, will automatically close the opening.

SUMMARY

An object of an embodiment is to fulfill the need referred to above. In accordance with the principles of an embodiment, this objective is obtained by providing a door for an arc-resistant compartment. The door includes surfaces defining at least one opening through the door, and flap structure. The flap structure includes a flap member coupled to the door and movable between an opened position permitting air to pass through the opening, and a closed position covering the opening. Spring structure is engaged with the flap member and is constructed and arranged to bias the flap member to the closed position. Handle structure is coupled to the flap member and extends through the door for moving the flap member to the opened position against the bias of the spring structure. Retaining structure is constructed and arranged to provide a retaining force on the flap member to retain the flap member in the open position, against the bias of the spring structure. The retaining structure is constructed and arranged such that during an arcing event in the compartment, pressure within the compartment together with the bias of the spring structure overcomes the retaining force to automatically move the flap member to the closed position.

In accordance with another aspect of an embodiment, a method provides for venting an arc-resistant compartment having a door for accessing an interior of the compartment. The method provides at least one opening through the door of the compartment. A flap member is mounted to the door in the interior of the compartment so that the flap member is movable between an opened position permitting air to pass through the opening, and a closed position covering the opening. The flap member is moved, against a biasing force, to be in the opened position. A retaining force is provided, against the biasing force, to retain flap member in the opened position. During an arcing event in the compartment, resulting pressure in the interior together with the biasing force automatically moves the flap member, against the retaining force, to the closed position.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
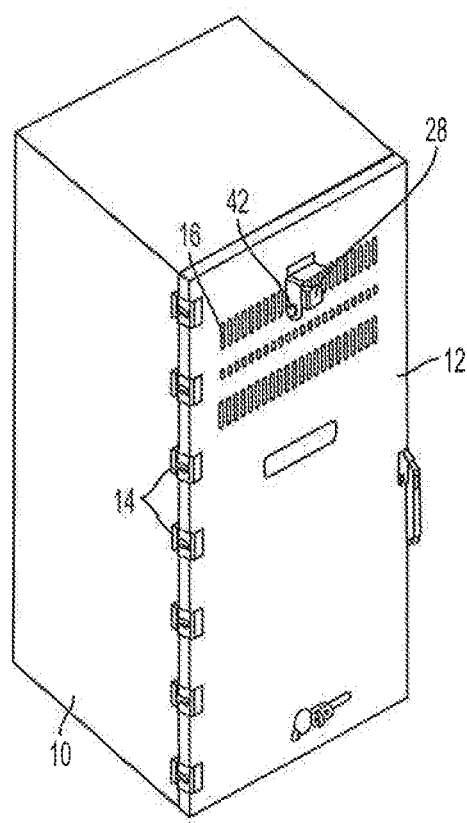
FIG. 1 is a front perspective view of a door, coupled to an arc-resistant compartment, with flap structure, in accordance with an embodiment, with the flap structure shown in an opened position.

With reference to FIG. 1, an arc-resistant compartment 10 such as, for example, a circuit breaker, a current limiter, or other compartment for use in the power generation/distribution industry, is shown having a door 12 provided in accordance with an embodiment. The door 12 is coupled to the compartment by hinges 14 so as to be opened to gain access to the interior of the compartment 10. When the door 12 is closed, the compartment 10 is sealed. The door 12 includes surfaces defining at least one opening 16 through the door 12. In the embodiment, a plurality of openings 16 are provided and are located in the same general area.

Figure 2:
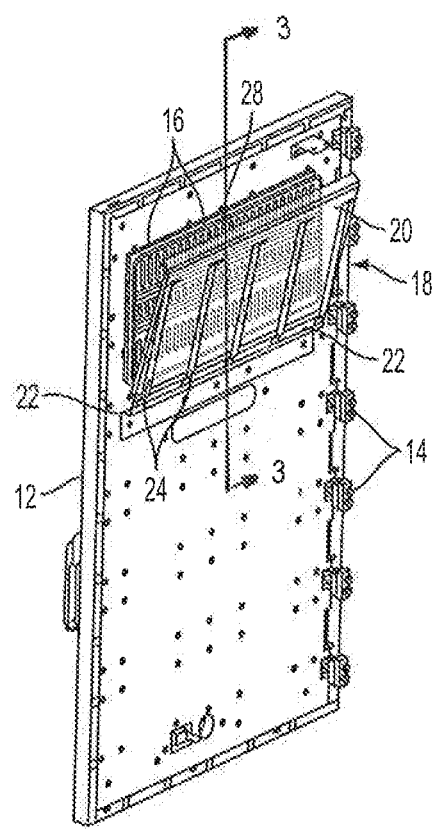
FIG. 2 is a rear perspective view of the door of FIG. 1.
Figure 5:
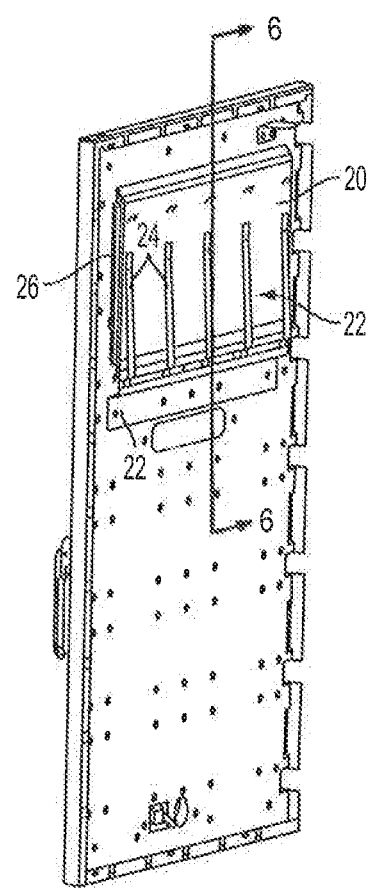
FIG. 5 is a rear perspective view of the door of FIG. 4.

As best shown in FIG. 2, the door 12 includes flap structure, generally indicated at 18, in accordance with an embodiment. The flap structure 18 includes a flap member 20 coupled to the door 12 via hinge structure 22 in an interior of the compartment 10 so as to be movable between an opened position (FIG. 2) permitting air to pass through the opening(s) 16 to ventilate the compartment 10 and a closed position (FIG. 5) sealing covering the opening(s) 16 during an arcing event. The flap member 20 is preferably made from a thermoplastic polycarbonate and is shown as a transparent member in FIG. 2. The flap structure 18 includes spring structure, generally indicated at 22, that engages the flap member 20 and biases the flap member 20 to the closed position. In the embodiment, the spring structure 22 includes a plurality of leaf springs 24 that engage a back portion of the flap member 20. A gasket 26 is provided about a periphery of the flap member 20 to sealing close the opening(s) when the flap member 20 is in the closed position. Another gasket 26' (FIG. 3) can be provided about a periphery of the area defining the openings 16 to assist in sealing the openings 16 when the flap member 20 is in the closed position. Thus the gaskets 26, 26' are provided between the flap member 20 and the door 12.

Figure 3:
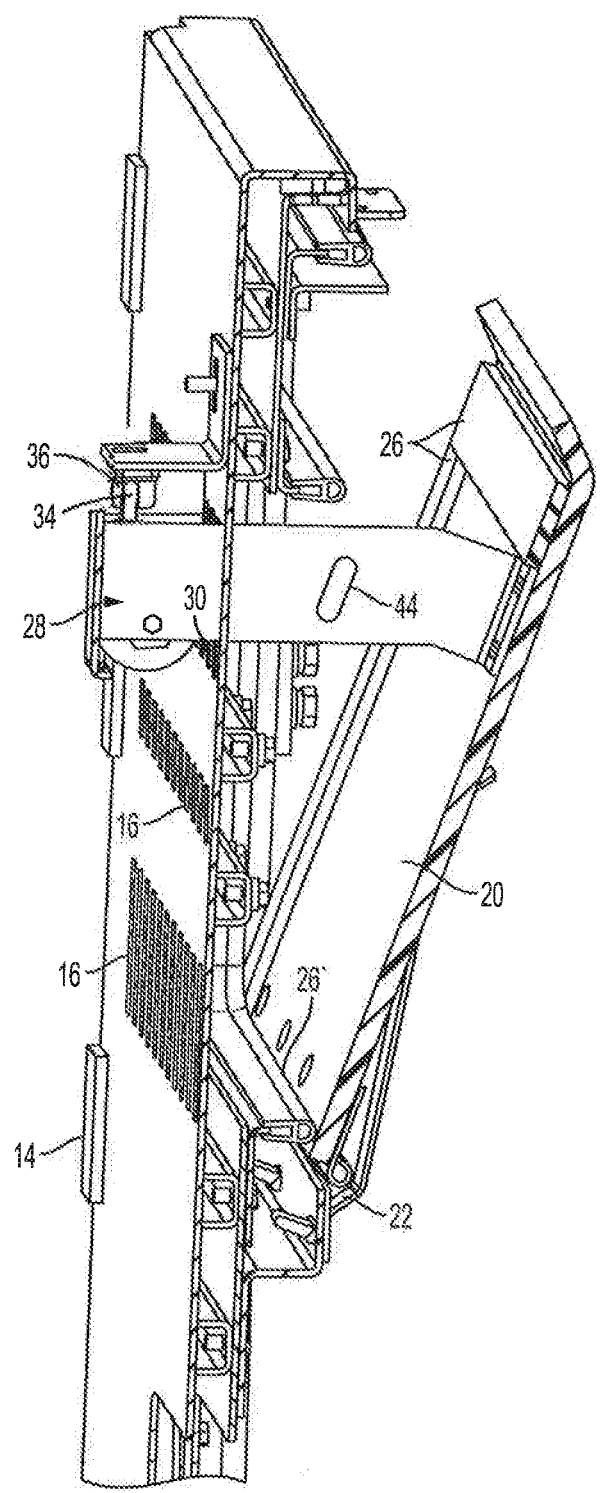
FIG. 3 is a cross-sectional view of the flap structure, taken along the line 3-3 of FIG. 2, coupled to the door and shown in the opened position.
Figure 4:
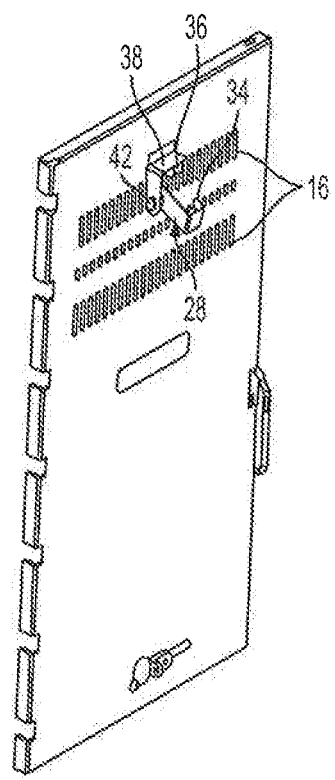
FIG. 4 is a front perspective view of the door of FIG. 1, but with flap structure shown in a closed position.
Figure 6:
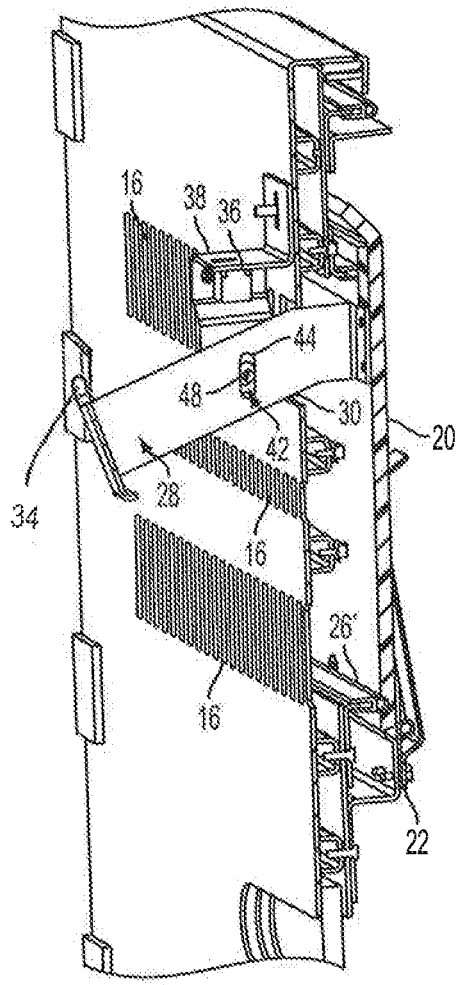
FIG. 6 is a cross-sectional view of the flap structure, taken along the line 6-6 of FIG. 5, coupled to the door and shown in the closed position.

With reference to FIGS. 3 and 6, the flap structure 18 includes handle structure, generally indicated at 28. The handle structure 28 is coupled to the flap member 20 and extends through an opening 30 in the door 12. From the closed flap member position in FIG. 6, the handle structure 28 is manually engaged and pushed toward the door 12 to move the flap member 20 to the opened position (FIG. 3) against the bias of the spring structure 22. In the opened position of the flap member 20, air freely passed through the opening(s) 16 to minimize the temperature rise in the compartment 10. Since the opening(s) 16 is provided in the large door 12, which is unlike conventional venting openings in arc-resistant compartments, the amount of air entering the compartment 10 is increased. Opening 30 is sealed by the gaskets 26, 26' when the flap member 20 is in the closed position.

Once the flap member 20 is in the opened position, retaining structure, generally indicated at 32, is constructed and arranged to provide a retaining force on the flap member 20 to retain the flap member 20 in the open position, against the bias of the spring structure 22. In the embodiment, the retaining structure is a conventional ball catch structure comprising a strike member 34 fixed to a portion of the handle structure 28 and catch member 36 fixed to a bracket 38 coupled to the door 12. The catch member 36 includes a pair of balls 40 that engage the strike member 34. Thus, in the embodiment, both the strike member 34 and catch member 36 are disposed on the outside of the door 12. When the flap member 20 is moved to the opened position, the strike member 34 frictionally engages the balls 40 of the catch member 36 to retain the flap member 20 in the opened position. During an arcing event in the compartment 10, pressure within the compartment together with the bias of the spring structure 22 overcomes the retaining (friction) force of the retaining structure 32 to automatically move the flap member 20 to the closed position to reduce gas leakage from the compartment 10 during the arcing event.

Figure 7:
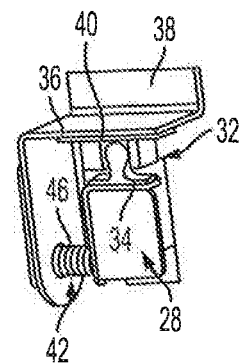
FIG. 7 is a view of plunger structure and retaining structure of the door of FIG. 3.
Figure 8:
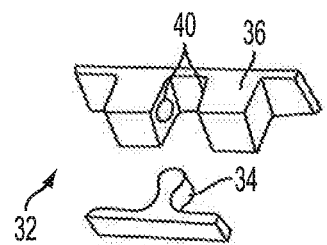
FIG. 8 is an exploded view of the retaining structure of FIG. 7.

Upon closing of the flap member 20 during the arcing event, it is important to prevent bounce back of the flap member 20 so as to reduce gas leakage. Thus, with reference to FIGS. 6 and 7, in the embodiment, a plunger structure, generally indicated at 42, mounted on bracket 38, engages a slot 44 defined in the handle structure 28. The plunger structure 42 is conventional and is spring loaded so that the spring 46 is compressed when the flap member 20 is in the opened position. The spring 46 expands and causes a plunger 48 to engage the slot when the flap member 20 is moved to the closed position.

The door 12 with the opening(s) 16 minimize the temperature rise in the arc-resistant compartment 10, while the fast, spring assisted closing of the flap member 20 prevents gas leakage from the compartment during an arcing event.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A door for an arc-resistant compartment, the door comprising:
    surfaces defining at least one opening through the door, and
    a flap structure comprising:
        a flap member coupled to the door and movable between an opened position permitting air to pass through the opening, and a closed position covering the opening,
        at least one leaf spring engaged directly with a back portion of the flap member and constructed and arranged to bias the flap member to the closed position,
        a handle structure coupled to the flap member and extending through the door for manually moving the flap member to the opened position against the bias of the at least one leaf spring, and
        retaining structure constructed and arranged to provide a retaining force on the flap member to retain the flap member in the open position, against the bias of the at least one leaf spring, the retaining structure being constructed and arranged such that during an arcing event in the compartment, pressure within the compartment together with the bias of the at least one leaf spring overcomes the retaining force to automatically move the flap member to the closed position,
    wherein the retaining structure includes a strike member mounted to the handle structure and a catch member mounted to the door such that when the flap member is in the opened position, the strike member frictionally engages the catch member.

2. The door of claim 1, further comprising plunger structure mounted on the door and engageable with the handle structure to prevent further movement of the flap member once the flap member moves to the closed position.

3. The door of claim 2, wherein the plunger structure includes a spring loaded plunger constructed and arranged to engage a slot in the handle structure when the flap member is in the closed position.

4. The door of claim 1, further comprising at least one gasket between the flap member and the door constructed and arranged to seal the opening when the flap member is in the closed position.

5. The door of claim 1, wherein the catch member includes at least one ball that frictionally engages the strike member.

6. The door of claim 1, in combination with the compartment, the door being constructed and arranged, when opened, to provide access to an interior of the compartment.

7. The combination of claim 6, wherein the compartment is a circuit breaker or a current limiter compartment.

8. The door of claim 1, wherein the at least one leaf string comprises a plurality of leaf springs each directly engaging the back portion of the flap structure, with a front portion of the flap structure being adjacent to the at least one opening.

9. A door for an arc-resistant compartment, the door comprising:
    surfaces defining at least one opening through the door,
    a flap structure comprising:
        a flap member coupled to the door and movable between an opened position permitting air to pass through the opening, and a closed position covering the opening, a plurality of leaf springs each directly engaged with a back portion of the flap member and constructed and arranged to bias the flap member to the closed position, a handle structure coupled to the flap member and extending through the door for manually moving the flap member to the opened position against the bias of the leaf springs, and retaining structure constructed and arranged to provide a retaining force on the flap member to retain the flap member in the open position, against the bias of the leaf springs, the retaining structure being constructed and arranged such that during an arcing event in the compartment, pressure within the compartment together with the bias of the leaf springs overcomes the retaining force to automatically move the flap member to the closed position, wherein the retaining structure includes a strike member mounted to the handle structure and a catch member mounted to the door such that when the flap member is in the opened position, the strike member frictionally engages the catch member, and plunger structure mounted on the door and engageable with the handle structure to prevent further movement of the flap member once the flap member moves to the closed position.

10. The door of claim 9, wherein the plunger structure includes a spring loaded plunger constructed and arranged to engage a slot in the handle structure when the flap member is in the closed position.

* * * * *